United States Patent
Crawford et al.

(10) Patent No.: US 7,734,487 B2
(45) Date of Patent: Jun. 8, 2010

(54) PROCESS DRIVEN QUALITY MEASURES

(75) Inventors: Vanadis M. Crawford, Raleigh, NC (US); Angela C. Pitts, Burlington, NC (US); Rosalind Toy Allen Radcliffe, Durham, NC (US); Leah Ann Seifert, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 1544 days.

(21) Appl. No.: 10/718,857

(22) Filed: Nov. 21, 2003

(65) Prior Publication Data

US 2005/0114106 A1 May 26, 2005

(51) Int. Cl.
*G06F 17/50* (2006.01)
(52) U.S. Cl. .................. 705/7; 705/8; 705/10; 705/500
(58) Field of Classification Search .................... 705/10, 705/7
See application file for complete search history.

(56) References Cited

U.S. PATENT DOCUMENTS

| | | | | |
|---|---|---|---|---|
| 5,278,751 | A | 1/1994 | Adiano et al. | 364/402 |
| 6,535,775 | B1 | 3/2003 | Bagepalli et al. | 700/109 |
| 2002/0165765 | A1 | 11/2002 | Sommerfeld et al. | 705/14 |
| 2003/0018511 | A1* | 1/2003 | Bicknell et al. | 705/9 |
| 2003/0135399 | A1 | 7/2003 | Ahamparam et al. | 705/7 |
| 2003/0188290 | A1* | 10/2003 | Corral | 717/101 |
| 2004/0010441 | A1* | 1/2004 | Nandigama et al. | 705/10 |

OTHER PUBLICATIONS

Vouk, Mladen A. "Software Reliability Engineering" 2000 Annual Reliability and Maintainability Symposium http://renoir.csc.ncsu.edu/Faculty/Vouk.*
Vouk, Mladen A. "Software Reliability Engineering" 2000 Annual Reliability and Maintainability Symposium http://renoir.csc.ncsu.edu/Faculty/Vouk.*
Mendonca, M, "Validation of an Approach for Improving Existing Measurement Frameworks" IEEE Transactions on Software Engineering, vol. 26, No. 6, Jun. 2000.*
Vouk, "Software Reliability Engineering," *2000 Annual Reliability and Maintainability Symposium*, 2000.

* cited by examiner

*Primary Examiner*—Romain Jeanty
*Assistant Examiner*—Mark A Fleischer
(74) *Attorney, Agent, or Firm*—VanLeeuwen & VanLeeuwen (57) ABSTRACT

A common metrics manager analyzes customer feedback responses, and assigns a weighted priority to each feedback response. The weighted priority corresponds to a particular feedback response's impact on business goals, such as customer satisfaction. The common metrics manager uses weighted priority feedback responses to generate and rank a set of common metrics. The common metrics manager uses the common metrics to generate phase goals for each phase of a product's lifecycle. The number of phase goals for each product phase corresponds to the ranking of each particular common metric. Once a product ships to a customer which is developed using the common metrics, the customer sends feedback responses to the common metrics manager which the common metrics manager uses to generate new common metrics for use with a new product lifecycle.

13 Claims, 6 Drawing Sheets

| | COMMON METRICS | WEIGHTED PRIORITY COUNT |
|---|---|---|
| 512 | Capability | 120 |
| 514 | Usability | 90 |
| 516 | Performance | 80 |
| 518 | Reliability | 70 |
| 520 | Installability | 60 |
| 522 | Maintainability | 50 |
| 524 | Documentation | 40 |
| 526 | Serviceability | 30 |

*Figure 5A*

| | COMMON METRICS | PRODUCT PHASE GOALS | | | | |
|---|---|---|---|---|---|---|
| | | PLAN | DESIGN | DEVELOP | TEST | RELEASE |
| 582 | Capability | 12 | 12 | 12 | 12 | 12 |
| 584 | Usability | 9 | 9 | 9 | 9 | 9 |
| 586 | Performance | 8 | 8 | 8 | 8 | 8 |
| 588 | Reliability | 7 | 7 | 7 | 7 | 7 |
| 590 | Installability | 6 | 6 | 6 | 6 | 6 |
| 592 | Maintainability | 5 | 5 | 5 | 5 | 5 |
| 594 | Documentation | 4 | 4 | 4 | 4 | 4 |
| 596 | Serviceability | 3 | 3 | 3 | 3 | 3 |

PROCESS DRIVEN QUALITY MEASURES

BACKGROUND OF THE INVENTION

1. Technical Field

The present invention relates in general to a system and method for process driven quality measures. More particularly, the present invention relates to a system and method for applying a set of common metrics to each of a product lifecycle's product phases.

2. Description of the Related Art

A business typically employs a product lifecycle to develop a product. A product lifecycle may include multiple "product phases", such as a planning phase, a design phase, a development phase, a test phase, and a release phase. Different individuals or groups may be responsible for each of these product phases, causing potential product goal miscommunication and misdirection amongst each product phase.

Some businesses develop a product without measurable quality criteria. These businesses may understand their target marketplace's quality requirements but the businesses do not apply their knowledge to a product's lifecycle goals. A challenge found is that a business may spend time and money to develop a product and discover that customers do not accept the product because the product lifecycle's goals do not match marketplace quality requirements.

Other businesses develop a product with measurable quality criteria that, however, are focused on individual product phases which may be a phase-dependent "important metric of the moment." These differences cause a business to change focus each time a product team changes from one phase to another phase. Changing focus impacts the overall quality of a product because the team is not working to a common set of quality goals.

For example, a business's goal during a "planning" phase may be to ensure that the plan meets an executive edict that the product ships by a specific date. Continuing this example, the business's goal during a "coding" phase may be to count unit test errors. A challenge found by having individual metrics that are segmented by product phases, however, is that some or all of the phases may not use metrics that are driven by marketplace quality requirements.

What is needed, therefore, is a system and method to consistently apply common metrics across each of a product lifecycle's phases.

SUMMARY

It has been discovered that the aforementioned challenges are resolved by using a set of common metrics to generate phase goals for each product phase in a product's lifecycle. The common metrics are generated and ranked using customer feedback responses which are weighted based upon a feedback response's relative importance to a business goal, such as customer satisfaction.

A common metrics manager applies a set of common metrics to product phases that correspond to a product lifecycle. Common metrics manager functions may be performed by a product team or may also be performed by an electronic computing device, such as a personal computer. A common metric encompasses three characteristics which are 1) the metric is measurable, 2) the metric is defined prior to the start of a product lifecycle, and 3) the metric is not altered through an entire product lifecycle. A product's lifecycle includes five product phases which are a planning phase, a design phase, a development phase, a test phase, and a release phase. As one skilled in the art can appreciate, product phases other than those that are described herein may be used during a product lifecycle.

The common metrics manager uses feedback responses it receives from a customer to generate a set of common metrics for use with a product lifecycle. The customer feedback response may be received from various feedback sources, such as a customer survey that corresponds to a previous product version, a help line report, or a field report. The common metrics manager analyzes each feedback response, and determines a weighted priority for each feedback response. A weighted priority is determined based upon the impact that the particular feedback response has on a business goal, such as customer satisfaction. For example, if a feedback response greatly affects customer satisfaction, such as the customer's product not functioning properly, the particular feedback response receives a high weighted priority. The feedback response's weighted priority is added to a corresponding common metric's weighted priority count which tracks the weighted priority of feedback responses for that particular common metric.

Once the common metrics manager analyzes each customer feedback response and identifies a set of common metrics, the common metrics manager generates phase goals for each product phase in a product lifecycle using the common metrics. The number of phase goals generated for a common metric corresponds to the importance (i.e. ranking) of the common metric. For example, if a common metric has a highest weighted priority count relative to other common metrics, the common metric has the most number of corresponding phase goals for each product phase. For example, if a common metric is "reliability" and it has the highest weighted priority count, the common metrics manager may generate a substantial amount of reliability-related phase goals for each product phase.

Once the phase goals for each phase are determined, a product is developed using the phase goals, and the product is released to a customer. In turn, a customer sends a feedback response corresponding to the released product to the common metrics manager. The common metrics manager utilizes the feedback response in order to refine and/or develop new common metrics to use with a subsequent product lifecycle.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
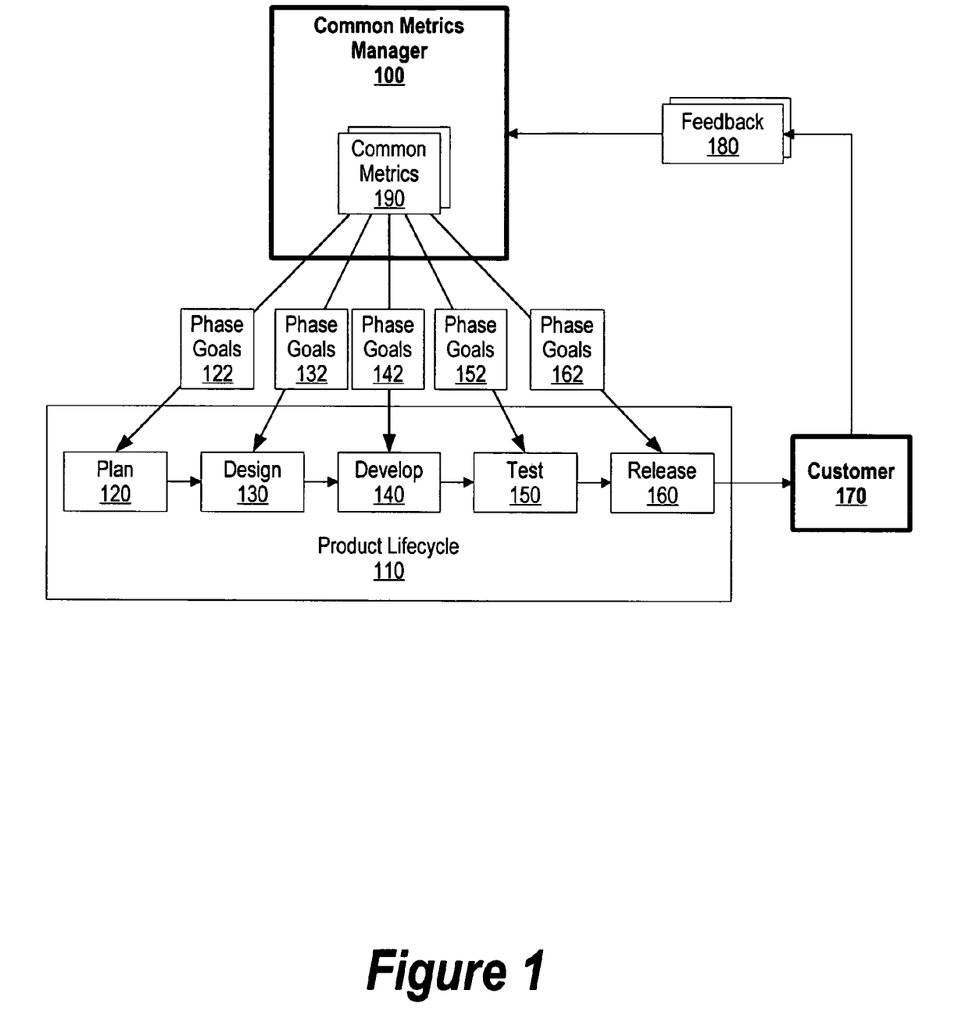
FIG. 1 is a diagram showing a common metrics manager applying a set of common metrics to each product phase that corresponds to a product lifecycle.

FIG. 1 is a diagram showing a common metrics manager applying a set of common metrics to each product phase that corresponds to a product lifecycle. Common metrics manager 100 may represent a product team or may also represent an electronic computing device, such as a personal computer.

Common metrics manager 100 applies a set of common metrics to product phases that correspond to product lifecycle 110. A common metric encompasses three characteristics which are 1) the metric is measurable, 2) the metric is defined prior to the start of a product lifecycle, and 3) the metric is not altered through an entire product lifecycle. Product lifecycle 110 includes five product phases which are planning phase 120, design phase 130, development phase 140, test phase 150, and release phase 160. As one skilled in the art can appreciate, product phases other than that which is shown in FIG. 1 may be used during a product lifecycle.

Common metrics manager 100 uses feedback responses (e.g. feedback 180) to generate a set of common metrics, such as common metrics 190, for use with product lifecycle 110. Feedback 180 is generated by customer 170 and may be received from various feedback sources, such as a customer survey that corresponds to a previous product version, a help line report, or a field report. Common metrics manager 100 analyzes each feedback response, and determines a weighted priority for each feedback response. A weighted priority is determined based upon the impact that the particular feedback response has on a business goal, such as customer satisfaction. For example, if a feedback response greatly effected customer satisfaction, such as the customer's product not functioning, the particular feedback response receives a high weighted priority (see FIG. 3 and corresponding text for further details regarding weighted priority determination). The feedback response's weighted priority is added to a corresponding common metric's weighted priority count which tracks the amount and the priority of feedback responses for that particular common metric.

Once common metrics manager 100 analyzes each feedback response and identifies a set of common metrics (e.g. common metrics 190), common metrics manager 100 generates phase goals for each product phase in product lifecycle 110 using common metrics 190. The number of phase goals generated for a common metric corresponds to the importance of the common metric. For example, if a common metric has the highest weighted priority count out of all of the common metrics, the common metric will have the most number of corresponding phase goals for each product phase.

Common metrics manager 100 generates phase goals 122 for use during planning phase 120. For example, if a common metric is "reliability", phase goals 122 may include specific planning phase line items to focus on reliability issues. Common metrics manager 100 generates phase goals 132 for use during design phase 130. Using the example described above, phase goals 132 may include specific design phase requirements to ensure that the product's design improves the overall reliability of the resulting product.

Common metrics manager 100 generates phase goals 142 for use during development phase 140. Using the example described above, phase goals 142 may include specific development phase requirements which require a software programmer to focus on product reliability. Common metrics manager 100 generates phase goals 152 for use during test phase 150. Using the example described above, phase goals 152 may include specific requirements to test a product's durability. Common metrics manager 100 generates phase goals 162 for use during development phase 160. Using the example described above, phase goals 162 may include specific release phase requirements to ensure the reliability of the product release, such as ensuring that the product is packaged with all key components and ensure the customer is able to order and receive the product in a timely manner.

Once a product is released to customer 170, customer 170 sends feedback 180 corresponding to the released product to common metrics manager 100 in which common metrics manager 100 uses to refine and/or develop new common metrics to use with a subsequent product lifecycle.

Figure 2:
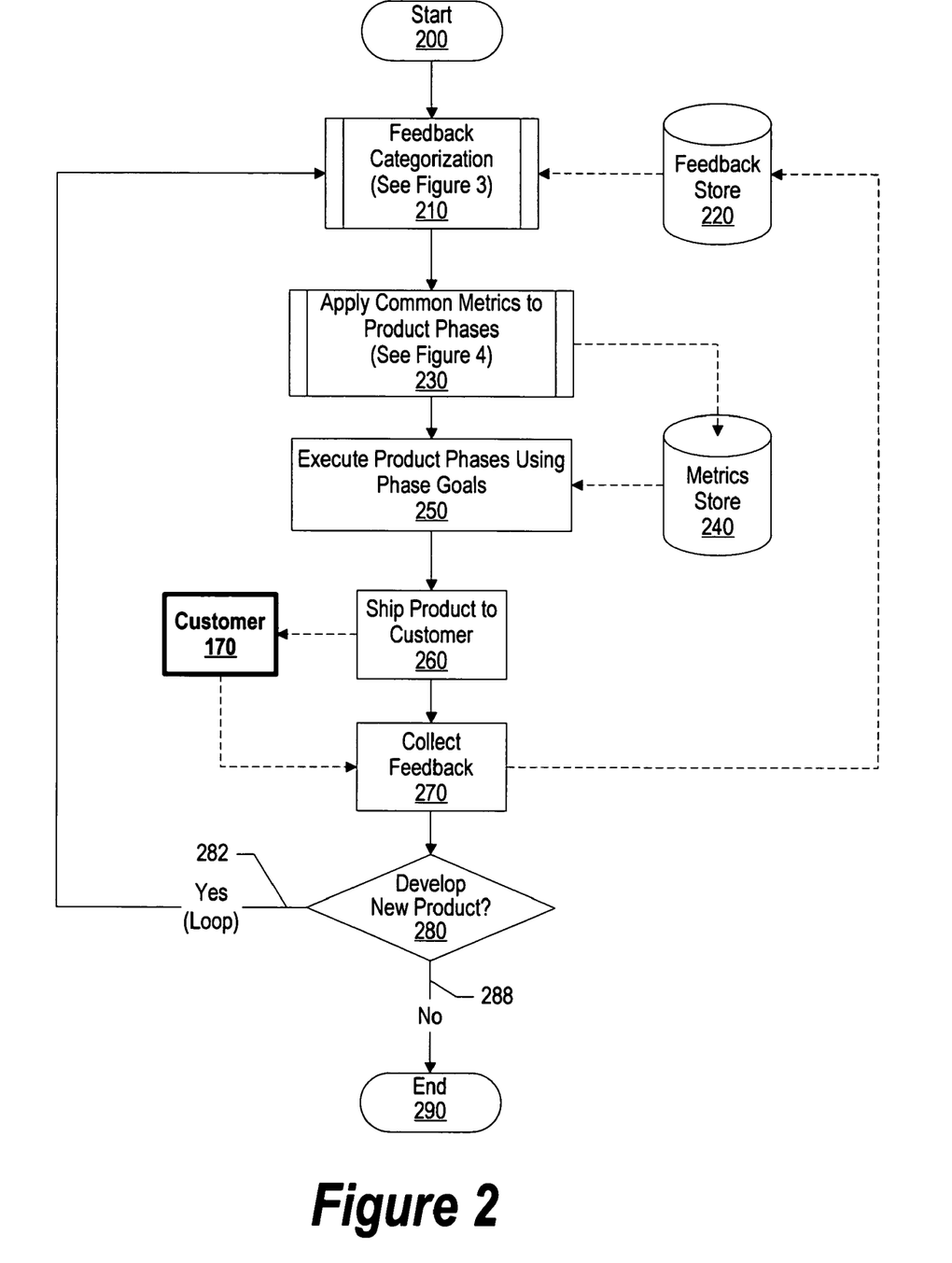
FIG. 2 is high-level flow chart showing steps taken in applying common metrics throughout a product lifecycle.

FIG. 2 is high-level flow chart showing steps taken in applying common metrics throughout a product lifecycle. Processing commences at 200, whereupon processing analyzes feedback that is located in feedback store 220 and categorizes the feedback into common metric categories (pre-defined process block 210, see FIG. 3 and corresponding text for further details). Feedback may come from various feedback sources, such as a customer survey, a help line report, a technical support line report, or a field report. Feedback store 220 may be stored on a nonvolatile storage area, such as a computer hard drive.

Figure 4:
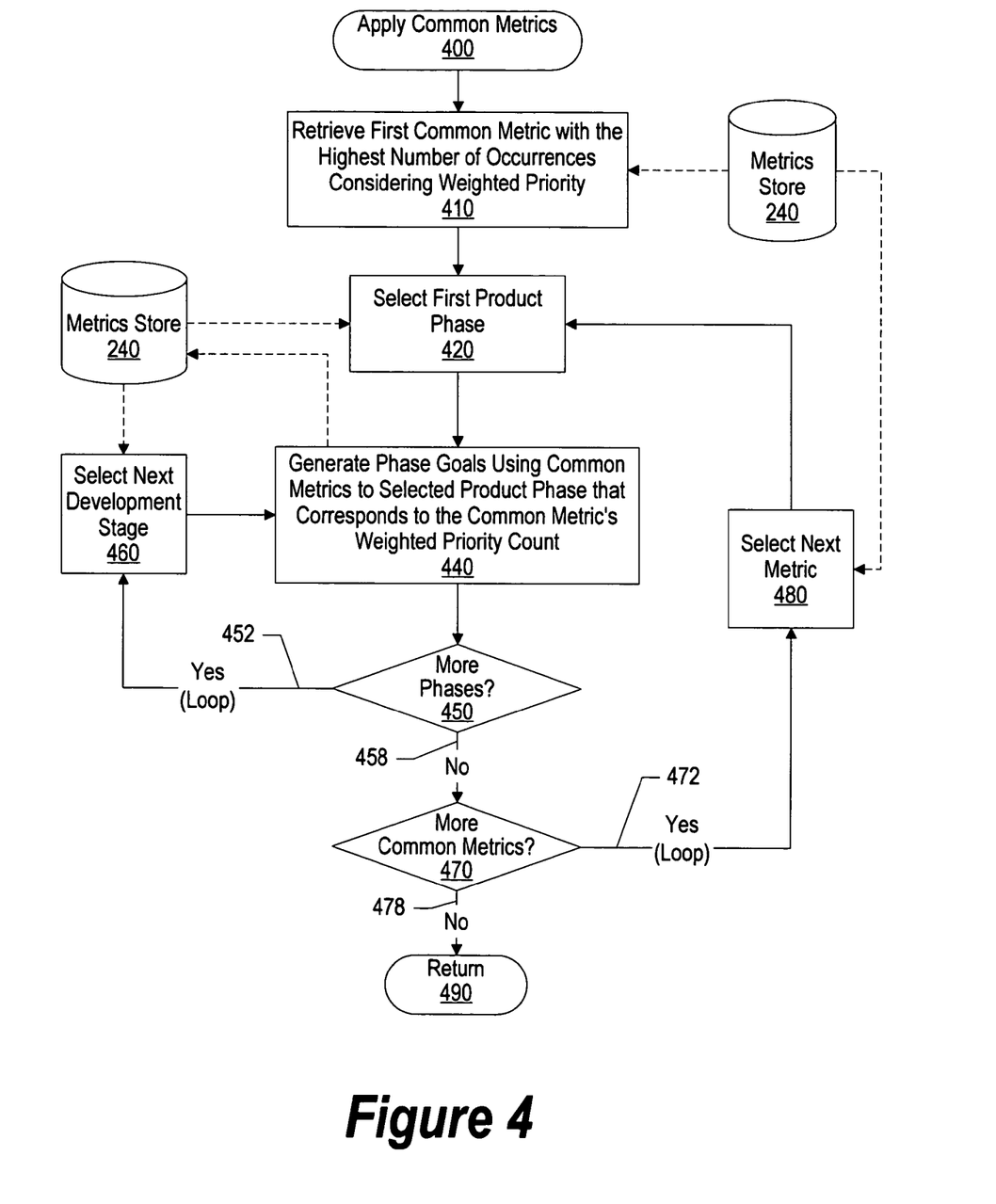
FIG. 4 is a flowchart showing steps taken in applying common metrics to each product phase of a product lifecycle.

Once processing has identified a set of common metrics, processing applies the common metrics to each product phase that corresponds to a product lifecycle in order to generate phase goals for each product phase (pre-defined process block 230, see FIG. 4 and corresponding text for further details). For example, if a common metric is "reliability", a phase goal for a "product test" phase may include specific tests that include extensive test conditions to measure the performance and durability of the product. Processing stores the generated phase goals in metrics store 240. Metrics store 240 may be stored on a nonvolatile storage area, such as a computer hard drive.

Processing executes each product phase using the created phase goals at step 250, and a product is shipped to customer 170 at step 260. Customer 170 is the same as that shown in FIG. 1. Processing collects feedback regarding the product at step 270. For example, customer 170 may send a customer survey. In another example, if customer 170 has problems with the product, customer 170 may call a technical support line in order to get assistance on the operation of the product. In this example, a technical support personnel may generate a report that describes the issue that customer 170 is experiencing. Customer 170's feedback is stored in feedback store 220 whereby the feedback may be used for product improvements and/or new product developments.

A determination is made as to whether to develop a new product (decision 280). If processing should develop a new product, decision 280 branches to "Yes" branch 282 which loops back to begin common metrics development for the new product using the collected customer feedback. This looping continues until processing should not develop a new product, at which point decision 280 branches to "No" branch 288 whereupon processing ends at 290.

Figure 3:
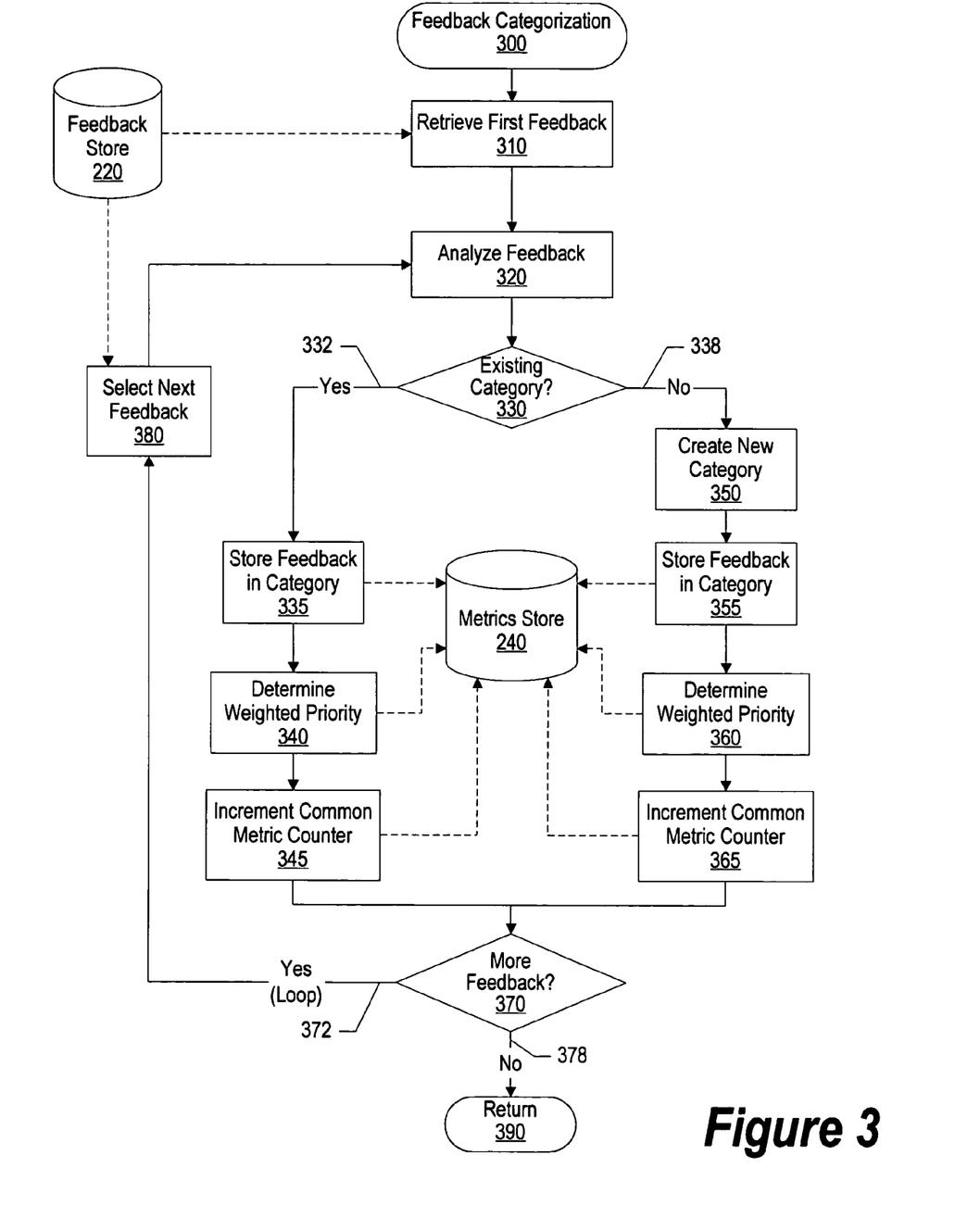
FIG. 3 is a flowchart showing steps taken in assigning a weighted priority to feedback and organizing the feedback into common metric categories.

FIG. 3 is a flowchart showing steps taken in assigning a weighted priority to feedback and organizing the feedback into common metric categories. Feedback categorization commences at 300, whereupon processing retrieves a first feedback response from feedback store 220 at step 310. A feedback response may come from various feedback sources, such as a customer survey, a help line report, a technical support line report, or a field report. Feedback store 220 is the same as that shown in FIG. 2 and may be stored on a nonvolatile storage area, such as a computer hard drive. Processing analyzes the retrieved feedback response at step 320. For example, the feedback may be analyzed to identify the criticality of the feedback, such as if a customer's product is inoperable due to the lack of reliability of the product.

A determination is made as to whether the retrieved feedback belongs in an existing common metric category (decision 330). Using the example described above, existing common metric categories may be usability and installability, and the retrieved feedback as described above relates to "reliability" which does not belong in either of the two existing common metric categories.

If the retrieved feedback does not belong in an existing metric category, decision 330 branches to "No" branch 338 whereupon processing creates a new category in metrics store 240 at step 350 (i.e. "reliability"). Metrics store 240 is the same as that shown in FIG. 2 and may be stored on a nonvolatile storage area, such as a computer hard drive. Processing stores the feedback in the newly created common metric category at step 355, and determines a weighted priority to correspond to the feedback at step 360. Using the example described above, the feedback may receive a high weighted priority due to the impact of the customer's issue.

Figure 5A:
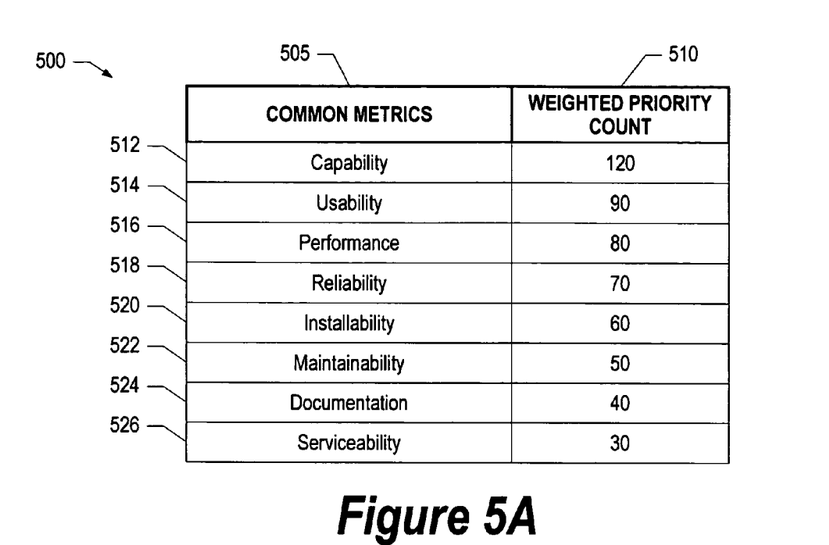
FIG. 5A is a table showing a list of common metrics and their corresponding weighted priority counts.

Processing increments a corresponding common metric counter to reflect the weighted priority at step 365 in a weighted priority look-up table stored in metrics store 240 (see FIG. 5A and corresponding text for further details regarding weighted priority look-up table properties).

If the retrieved feedback response corresponds to an existing common metric category, decision 330 branches to "Yes" branch 332 whereupon processing stores the feedback response in the corresponding common metric in the weighted priority look-up table located in metrics store 240. Processing determines a weighted priority to correspond to the retrieved feedback response at step 340, and increments the common metric category counter corresponding to the weighted priority in the weighted priority look-up table that is stored in metrics store 240.

A determination is made as to whether there are more feedback responses to categorize (decision 370). If there are more feedback responses to categorize, decision 370 branches to "Yes" branch 372 which loops back to select (step 380) and process the next feedback response. This looping continues until there are no more feedback responses to process, at which point decision 370 branches to "No" branch 378 whereupon processing returns at 390.

FIG. 4 is a flowchart showing steps taken in applying common metrics to each product phase of a product lifecycle. Processing commences at 400, whereupon processing retrieves a first common metric with a highest weighted priority count from metrics store 240 (step 410). A weighted priority count is a summation of weighted priorities that correspond to feedback responses which are based upon the impact of the feedback to a customer. For example, if a feedback response was received that was assigned a weighted priority of 10, the common metric's counter that corresponds to the feedback response is incremented by 10 (1×10=10) (see FIGS. 3, 5A, and corresponding text for further details regarding weighted priority numbers). Metrics store 240 is the same as that shown in FIG. 2 and may be stored on a nonvolatile storage area, such as a computer hard drive.

Processing selects a first product phase from metrics store 240 at step 420. Product phases correspond to a product's lifecycle, such as a planning phase, a design phase, a development phase, a test phase, and a release phase (see FIG. 1 and corresponding text for further details regarding product lifecycle phases). Processing generates phase goals for the selected product phase using the retrieved common metric at step 440. For example, if the retrieved common metric is "reliability", a "test phase" phase goal may include specific tests that include extensive test conditions to measure the performance and durability of a product.

A determination is made as to whether there are more product phases to apply the first common metric (decision 450). If there are more product phases to apply the first common metric, decision 450 branches to "Yes" branch 452 which loops back to select (step 460) and process the next product phase. This looping continues until there are no more product phases to process, at which point decision 450 branches to "No" branch 458.

A determination is made as to whether there are more common metrics to apply to product phases (decision 470). For example, a variety of common metrics may be applied to each product phase, such as "capability", "usability", and "performance." If there are more common metrics to apply to each product phase, decision 470 branches to "Yes" branch 472 which loops back to select (step 480) and process the next common metric. This looping continues until there are no more common metrics to process, at which point decision 470 branches to "No" branch 478 whereupon processing returns at 490.

FIG. 5A is a table showing a list of common metrics and their corresponding weighted priority counts. Table 500 includes columns 505 and 510. Column 505 includes a list of common metrics that are used for generating phase goals for each of a product lifecycle's phases. A product team may start with a few common metrics, and add more common metrics to their list during feedback analysis (see FIGS. 1, 3, and corresponding text for further details regarding feedback analysis). Column 510 includes a list of weighted priority counts that correspond to each common metric that is shown in column 505. A weighted priority count is a summation of feedback responses which are assigned a weighted priority based upon the impact of the feedback to the customer.

Table 500 includes rows 512 through 526 which show a plurality of corresponding weighted priority counts. Row 512 includes a "capability" common metric with a weighted priority count of "120." As can be seen in FIG. 5A, the "capability" common metric has a highest weighted priority count and, therefore, will have the highest priority placed on it when the "capability" common metric is applied to each product phase that is included in a product lifecycle. Row 514 includes a "usability" common metric with a weighted priority count of "90." Row 516 includes a "performance" common metric with a weighted priority count of "80." Row 518 includes a "reliability" common metric with a weighted priority count of "70." Row 520 includes an "installability" common metric with a weighted priority count of "60." Row 522 includes a "maintainability" common metric with a weighted priority count of "50." Row 524 includes a "documentation" common metric with a weighted priority count of "40." Row 526 includes a "serviceability" common metric with a weighted priority count of "30." As can be seen in FIG.

5A, the "serviceability" common metric has a lowest weighted priority count and, therefore, will have the lowest priority placed on it when the "serviceability" common metric is applied to each product phase that is included in a product lifecycle.

Figure 5B:
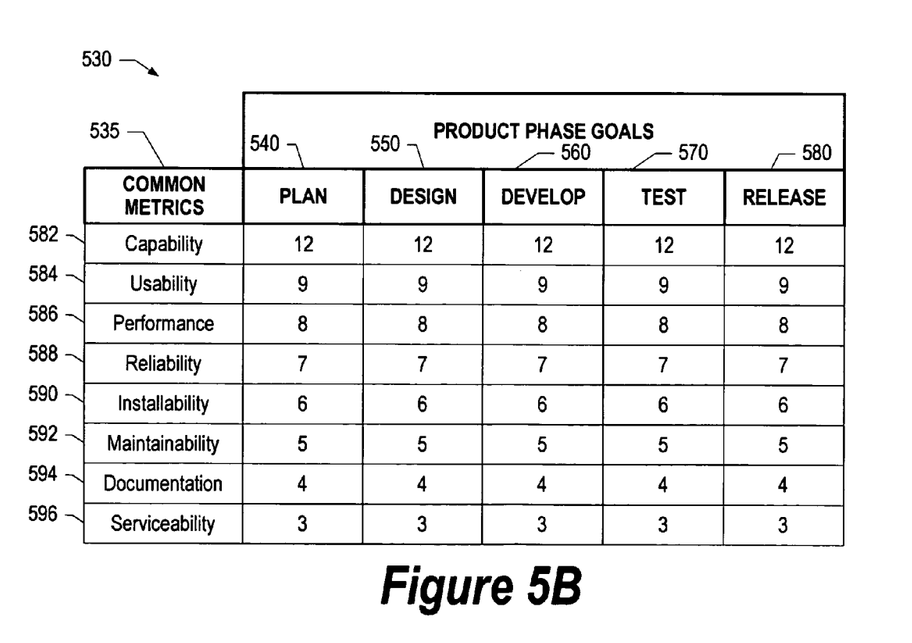
FIG. 5B is a table showing a list of common metrics and the number of phase goals that correspond to each common metric for each product phase.

FIG. 5B is a table showing a list of common metrics and the number of phase goals that correspond to each common metric for each product phase. Table 530 includes column 535 which includes a list of common metrics that a product team generated after analyzing feedback responses (see FIG. 3 and corresponding text for further details regarding feedback response analysis).

Table 530 also includes columns 540 through 580 which are a list of product phases that correspond to a particular product lifecycle. Columns 540, 550, 560, 570, and 580 correspond to a planning phase, a design phase, a development phase, a test phase, and a release phase, respectively. In addition, each column includes an amount of phase goals, or quantity value, that correspond to each common metric for each product phase. The amount of phase goals for a particular common metric is dependent upon the common metric's weighted priority count. For example, if a common metric has a high weighted priority count, the common metric is a high priority common metric, and, therefore, a large number of phase goals are generated to correspond to the common metric. As can be seen in the example shown in FIG. 5B compared with FIG. 5A, the quantity value of phase goals is computed by dividing the weighted priority count for each common metric by a factor of 10. As those skilled in the art can appreciate, other approaches may be utilized for computing quantity values from the weighted priority count (see FIG. 4 and corresponding text for further details regarding phase goal generation).

Table 530 includes rows 582 through 596 which correspond to particular common metrics. Row 582 includes a "capability" common metric whereby each product phase includes "12" phase goals to correspond with the capability metric. As can be shown in FIG. 5B, the "capability" metric has the most number of corresponding product goals. Row 584 includes a "usability" common metric whereby each product phase includes "9" phase goals to correspond with the usability metric. Row 586 includes a "performance" common metric whereby each product phase includes "8" phase goals to correspond with the performance metric. Row 588 includes a "reliability" common metric whereby each product phase includes "7" phase goals to correspond with the reliability metric. Row 590 includes an "installability" common metric whereby each product phase includes "6" phase goals to correspond with the installability metric. Row 592 includes a "maintainability" common metric whereby each product phase includes "5" phase goals to correspond with the maintainability metric. Row 594 includes a "documentation" common metric whereby each product phase includes "4" phase goals to correspond with the documentation metric. Row 596 includes a "serviceability" common metric whereby each product phase includes "3" phase goals to correspond with the serviceability metric.

Figure 6:
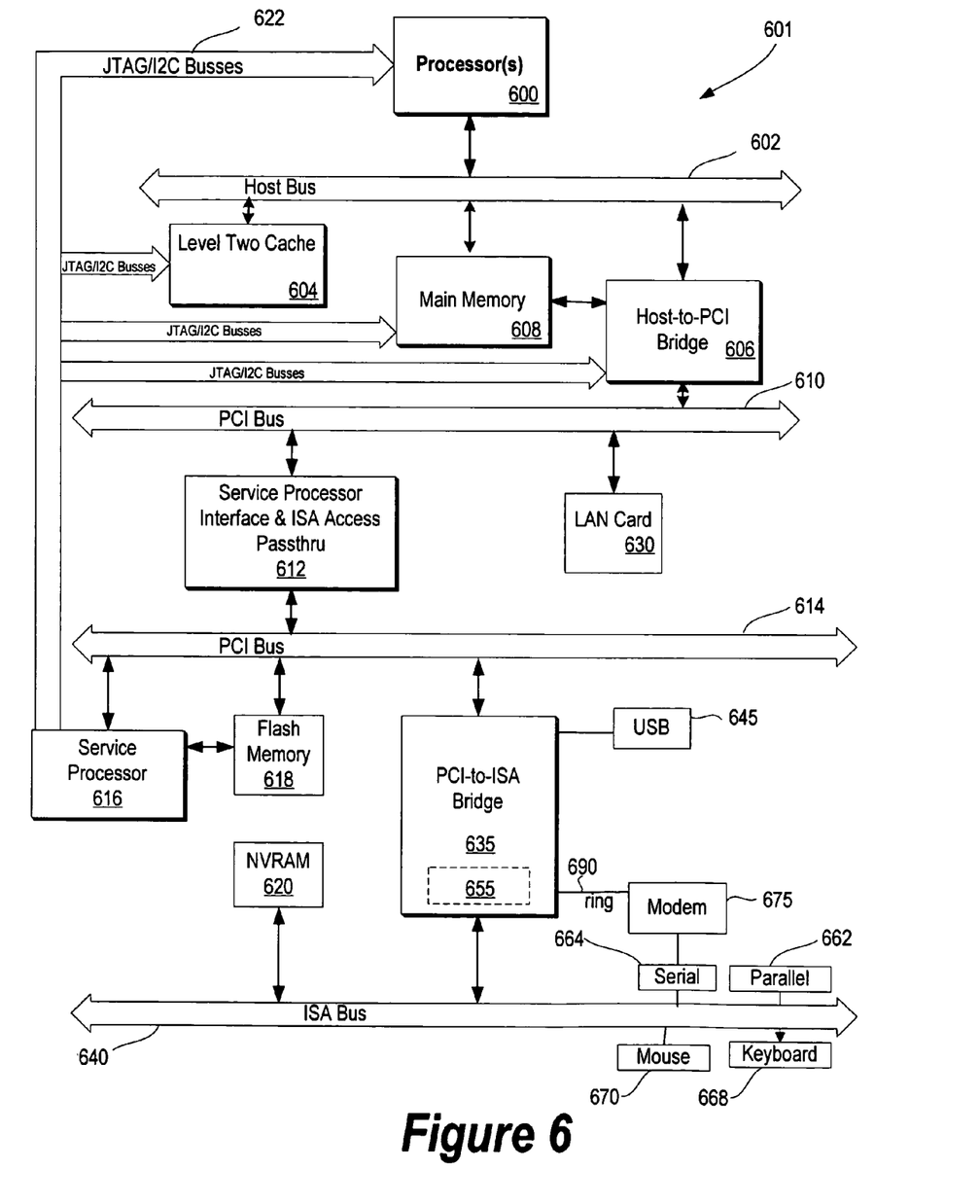
FIG. 6 is a block diagram of an information handling system capable of implementing the present invention.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   identifying a plurality of product phases that correspond to a product lifecycle;
   selecting a common metric from a plurality of common metrics, wherein the selected common metric is applicable to each of the plurality of product phases;
   identifying a weighted priority count for the selected common metric;
   computing a quantity value based upon the weighted priority count for the selected common metric, the quantity value corresponding to a number of phase goals to generate;
   utilizing a processor to generate a different group of phase goals for each of the plurality of product phases, wherein each of the different group of phase goals includes an amount of phase goals that are equal to the quantity value and correspond to the common metric;
   applying the different group of phase goals for each of the plurality of product phases to their corresponding plurality of product phases; and
   executing each of the plurality of product phases using their corresponding different group of phase goals.

2. The method of claim 1 further comprising:
   receiving one or more feedback responses from one or more feedback sources;
   analyzing one of the feedback responses; and
   generating each of the common metrics in response to the analysis.

3. The method of claim 2 wherein at least one of the feedback sources is selected from the group consisting of a customer survey, a help line response, a technical support response, and a field report.

4. The method of claim 1 wherein at least one of the plurality of product phases is selected from the group consisting of a planning phase, a design phase, a development phase, a test phase, and a release phase.

5. The method of claim 1 wherein the method is performed using an electronic computing device.

6. An information handling system comprising:
   one or more processors;
   a memory accessible by at least one of the processors;
   a nonvolatile storage area accessible by at least one of the processors;
   a set of instructions stored in the memory and executed by at least one of the processors in order to perform actions of:
     identifying a plurality of product phases that correspond to a product lifecycle;
     selecting a common metric from a plurality of common metrics, wherein the selected common metric is applicable to each of the plurality of product phases;
     identifying a weighted priority count for the selected common metric;
     computing a quantity value based upon the weighted priority count for the selected common metric, the quantity value corresponding to a number of phase goals to generate;
     generating a different group of phase goals for each of the plurality of product phases, wherein each of the different group of phase goals includes an amount of phase goals that are equal to the quantity value and correspond to the common metric;
     applying the different group of phase goals for each of the plurality of product phases to their corresponding plurality of product phases; and
     executing each of the plurality of product phases using their corresponding different group of phase goals.

7. The information handling system of claim 6 wherein the set of instructions further performs actions of:
   receiving one or more feedback responses from one or more feedback sources;
   analyzing one of the feedback responses; and
   generating each of the common metrics in response to the analysis.

8. The information handling system of claim 7 wherein at least one of the feedback sources is selected from the group consisting of a customer survey, a help line response, a technical support response, and a field report.

9. The information handling system of claim 6 wherein at least one of the plurality of product phases is selected from the group consisting of a planning phase, a design phase, a development phase, a test phase, and a release phase.

10. A computer program product stored in a computer readable medium, comprising functional descriptive material that, when executed by an information handling system, causes the information handling system to perform actions that include:
    identifying a plurality of product phases that correspond to a product lifecycle;
    selecting a common metric from a plurality of common metrics, wherein the selected common metric is applicable to each of the plurality of product phases;
    identifying a weighted priority count for the selected common metric;
    computing a quantity value based upon the weighted priority count for the selected common metric, the quantity value corresponding to a number of phase goals to generate;
    generating a different group of phase goals for each of the plurality of product phases, wherein each of the different group of phase goals includes an amount of phase goals that are equal to the quantity value and correspond to the common metric;

applying the different group of phase goals for each of the plurality of product phases to their corresponding plurality of product phases; and executing each of the plurality of product phases using their corresponding different group of phase goals.

11. The computer program product of claim 10 wherein the information handling system further performs actions that include:

receiving one or more feedback responses from one or more feedback sources;

analyzing one of the feedback responses; and generating each of the common metrics in response to the analysis.

12. The computer program product of claim 11 wherein at least one of the feedback sources is selected from the group consisting of a customer survey, a help line response, a technical support response, and a field report.

13. The computer program product of claim 10 wherein at least one of the plurality of product phases is selected from the group consisting of a planning phase, a design phase, a development phase, a test phase, and a release phase.

* * * * *